June 8, 1965 E. A. BRAUN 3,187,647
ROTATING CARTON TUCKER APPARATUS
Filed Oct. 25, 1962 11 Sheets-Sheet 1

INVENTOR.
ERIC A. BRAUN
BY
Frank B. Hill
AGENT

INVENTOR.
ERIC A. BRAUN
BY
Frank B. Hill
AGENT

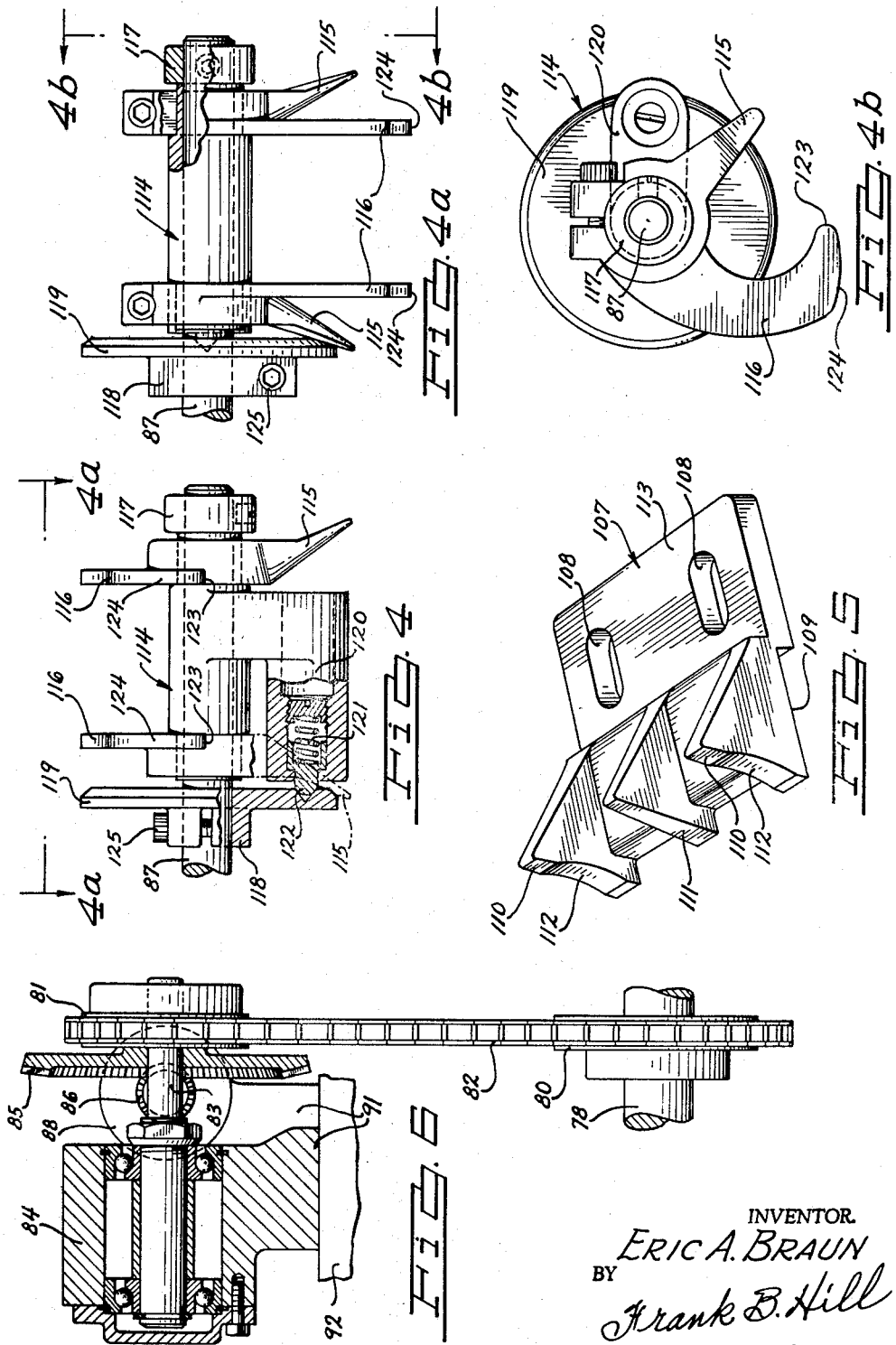

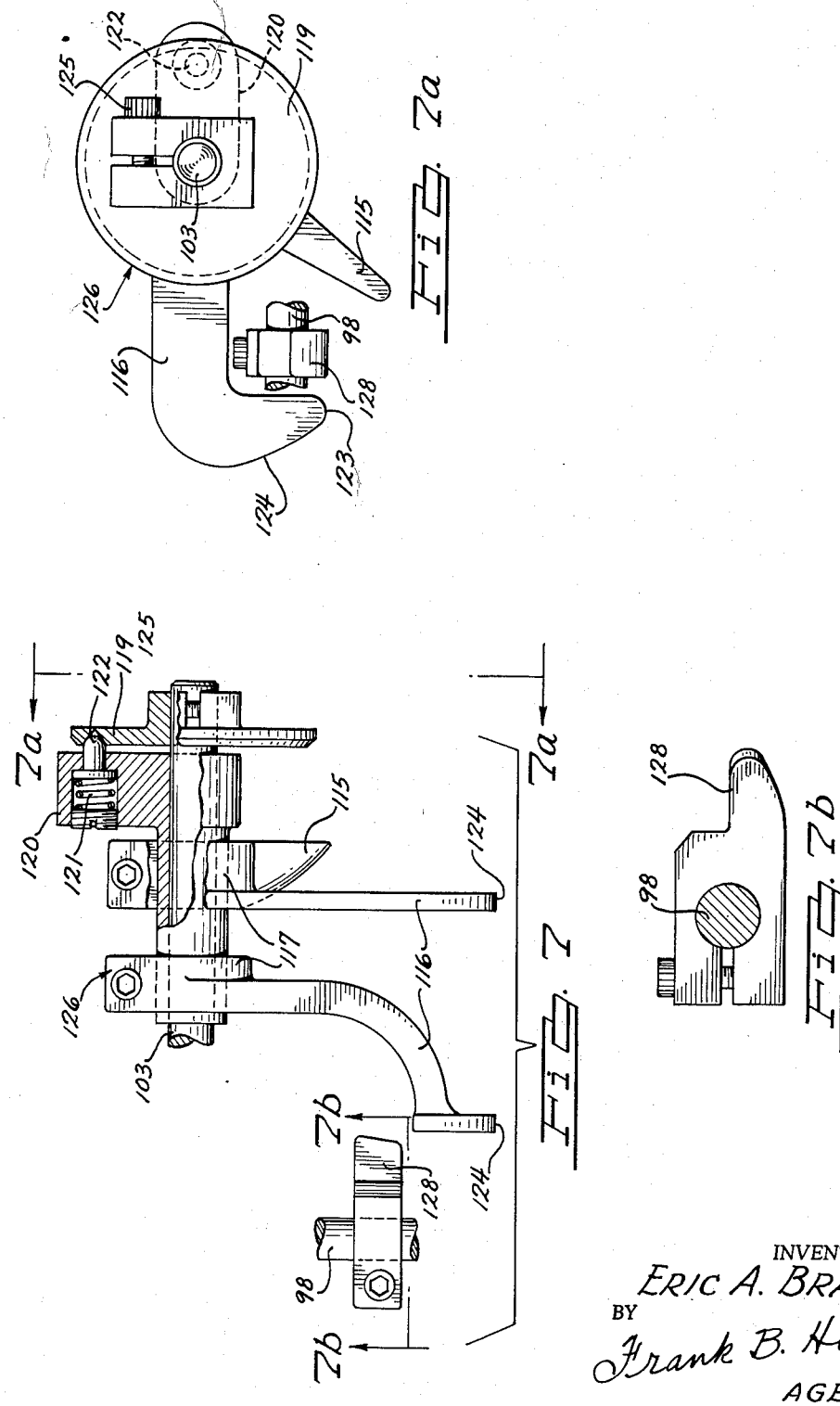

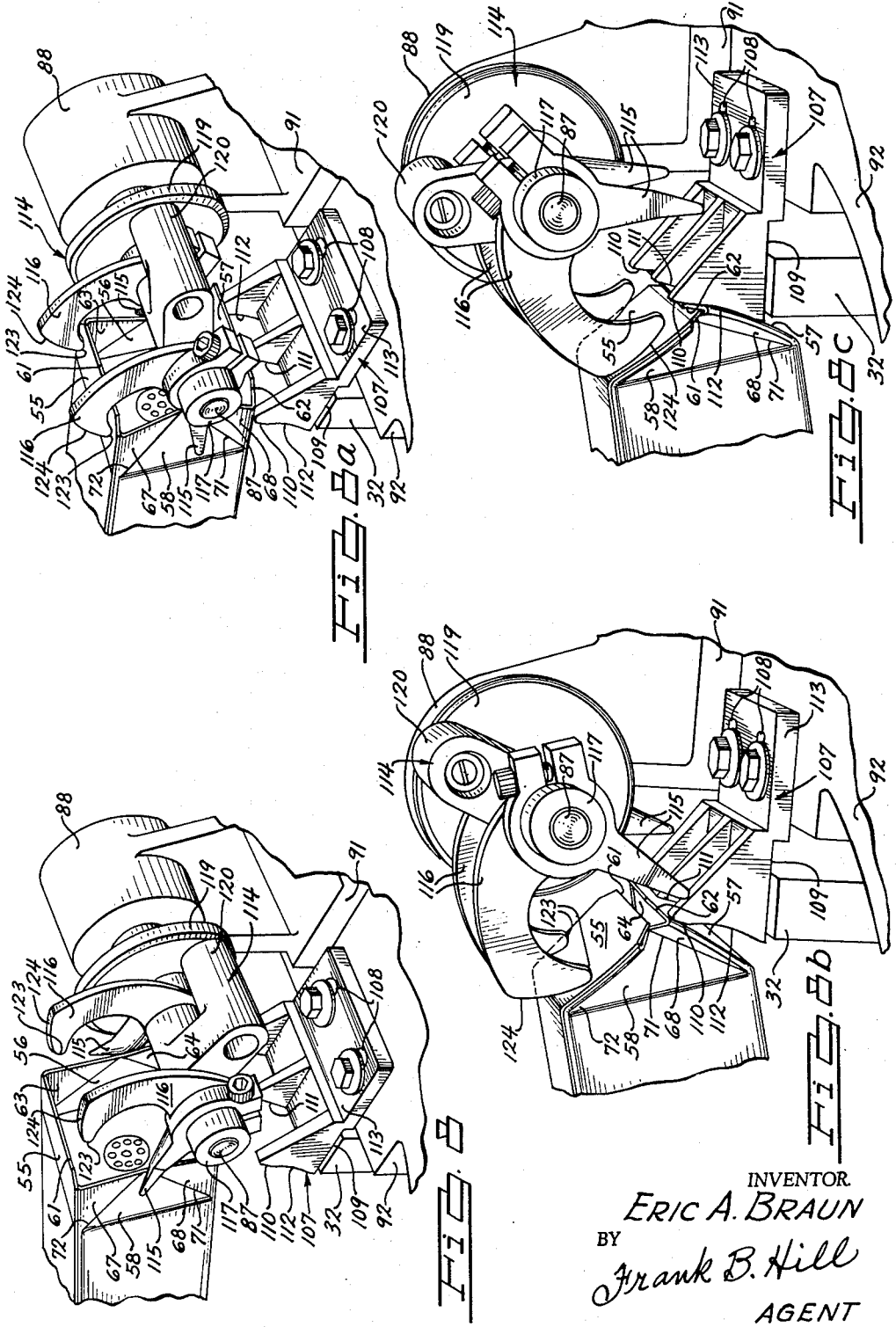

June 8, 1965  E. A. BRAUN  3,187,647
ROTATING CARTON TUCKER APPARATUS
Filed Oct. 25, 1962  11 Sheets-Sheet 7
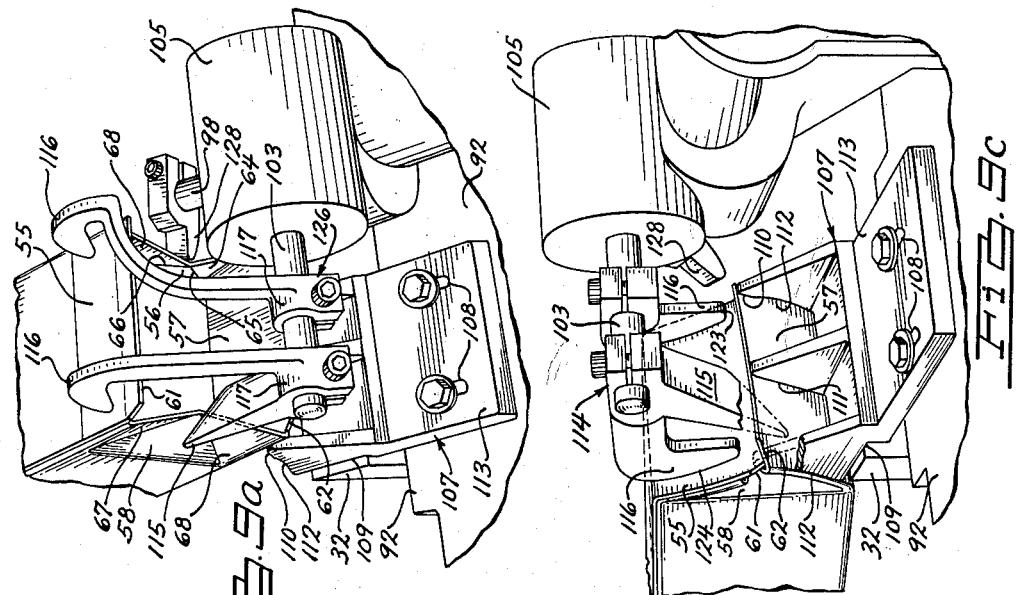
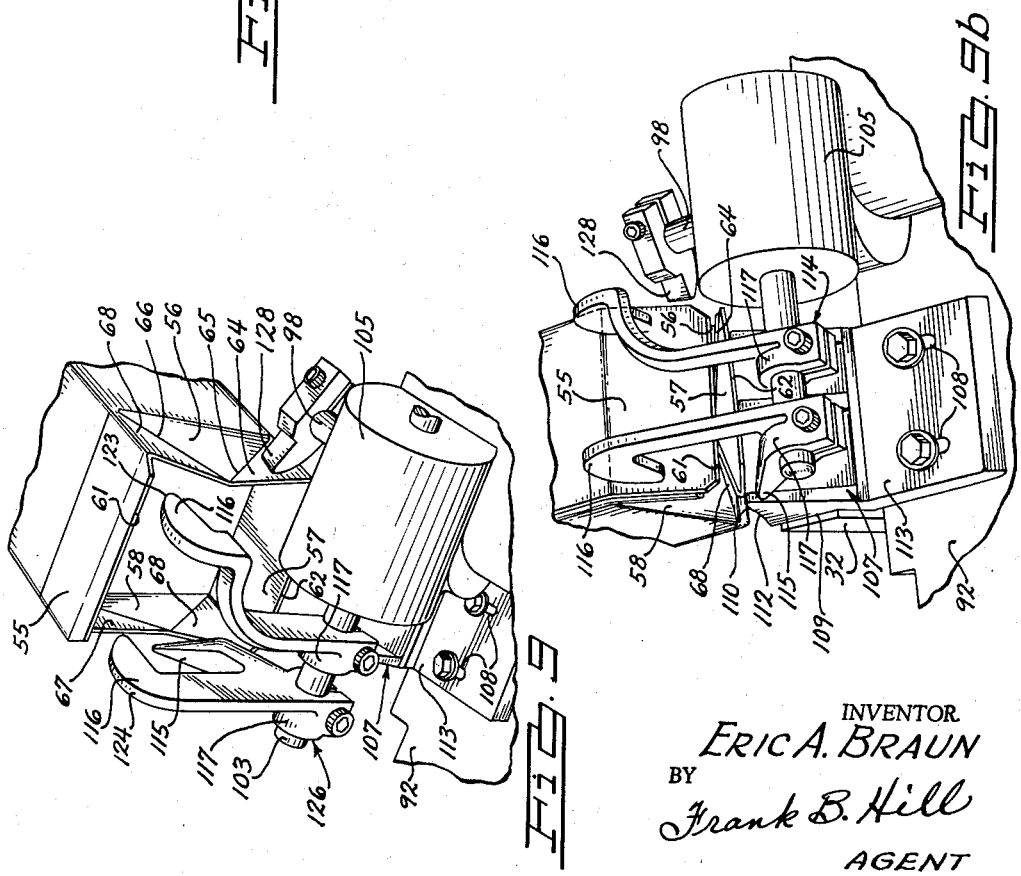
INVENTOR.
ERIC A. BRAUN
BY
Frank B. Hill
AGENT June 8, 1965  E. A. BRAUN  3,187,647
ROTATING CARTON TUCKER APPARATUS
Filed Oct. 25, 1962  11 Sheets-Sheet 8
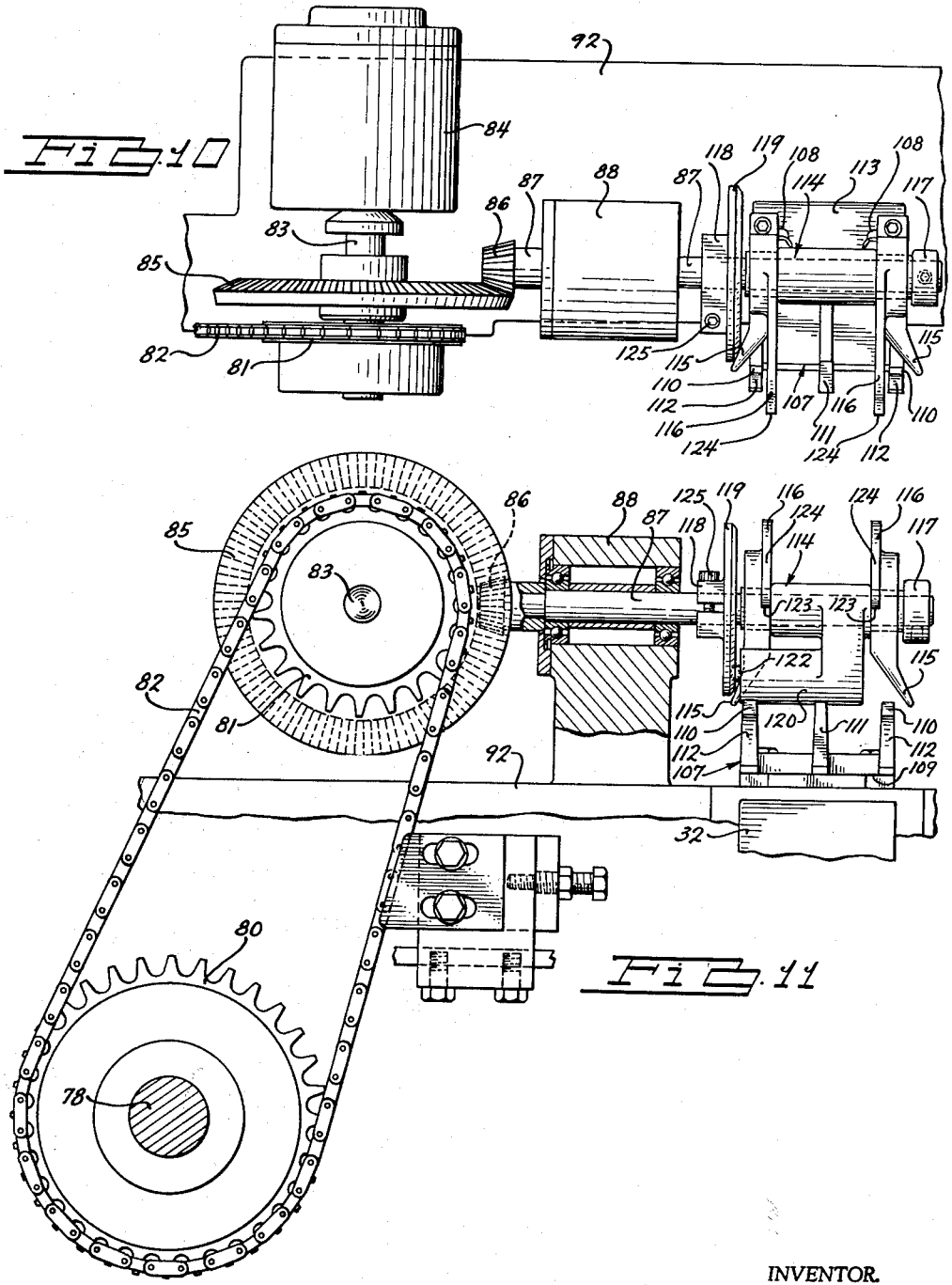
INVENTOR.
ERIC A. BRAUN
BY
Frank B. Hill
AGENT June 8, 1965   E. A. BRAUN   3,187,647
ROTATING CARTON TUCKER APPARATUS
Filed Oct. 25, 1962   11 Sheets-Sheet 9
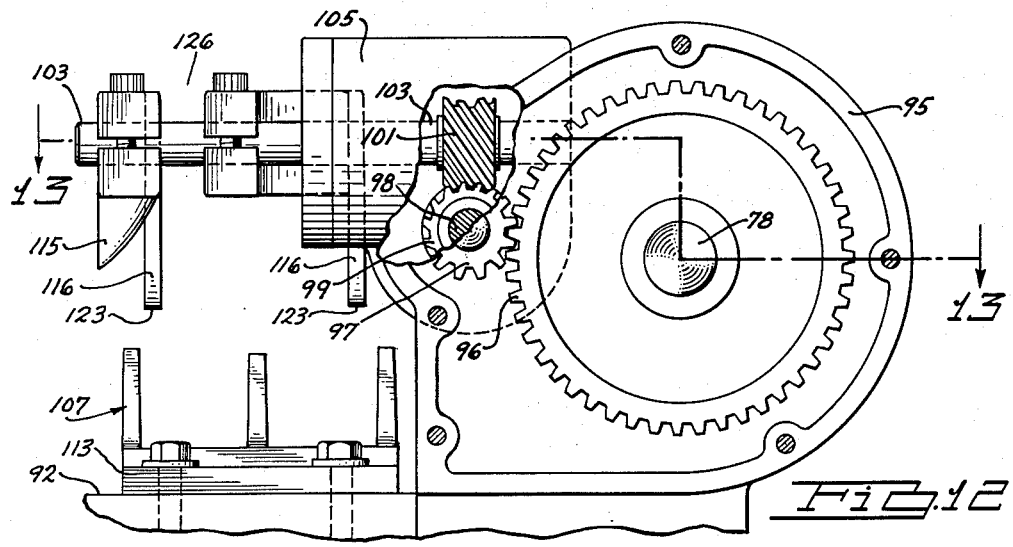
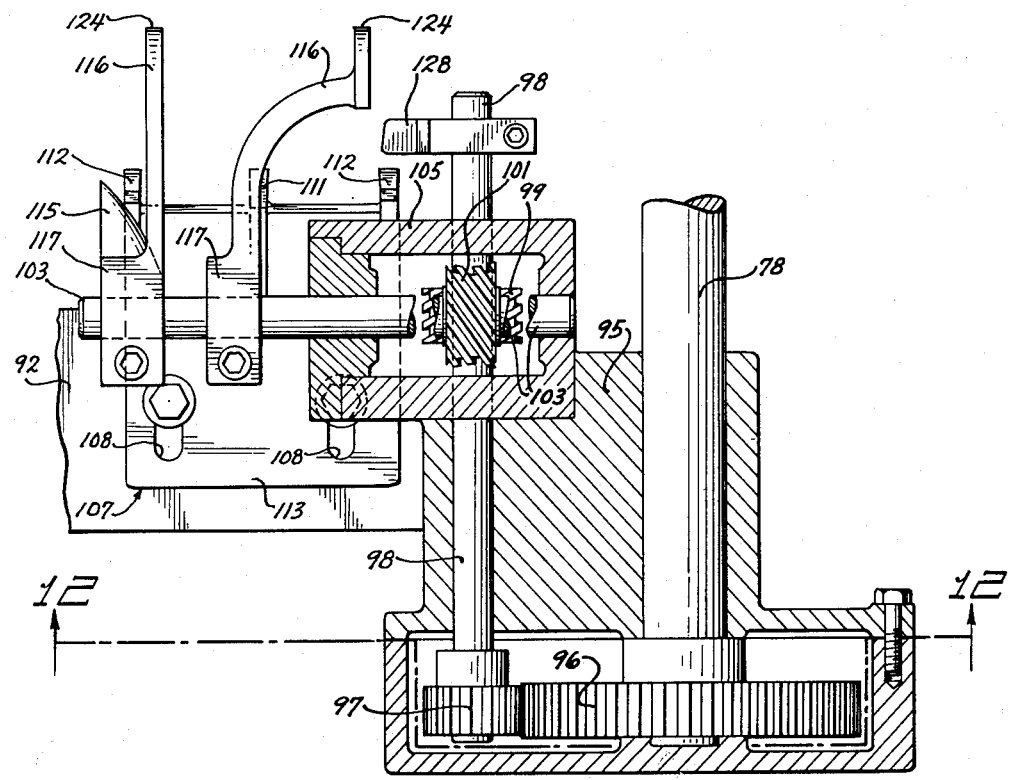
INVENTOR.
ERIC A. BRAUN
BY
Frank B. Hill
AGENT

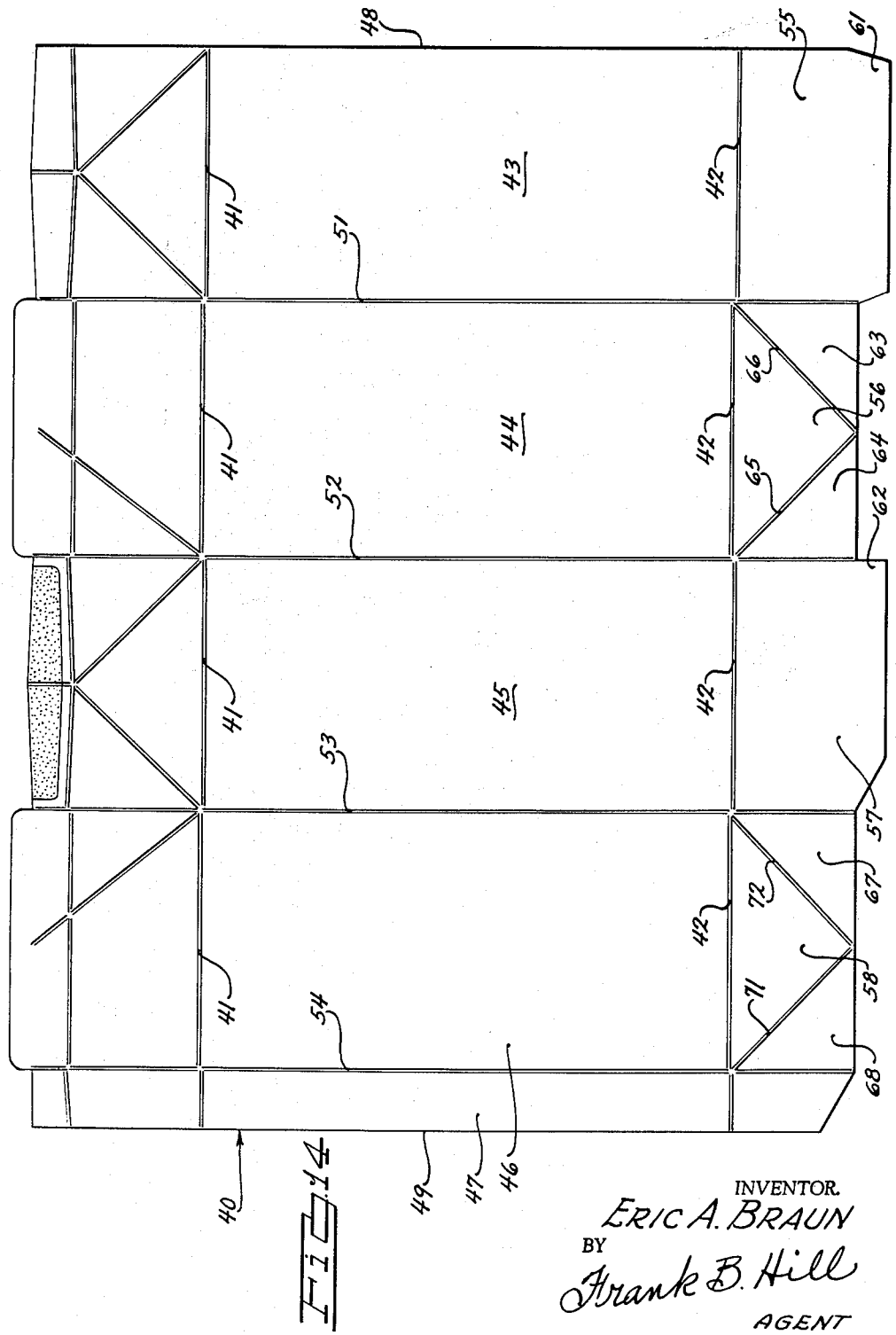

June 8, 1965  E. A. BRAUN  3,187,647
ROTATING CARTON TUCKER APPARATUS
Filed Oct. 25, 1962  11 Sheets-Sheet 11

INVENTOR.
ERIC A. BRAUN
BY
Frank B. Hill
AGENT

United States Patent Office 3,187,647
Patented June 8, 1965

3,187,647
ROTATING CARTON TUCKER APPARATUS
Eric A. Braun, Farmington, Mich., assignor to Ex-Cell-O
Corporation, Detroit, Mich., a corporation of Michigan
Filed Oct. 25, 1962, Ser. No. 232,942
12 Claims. (Cl. 93—44.1)

This invention in general relates to paperboard container forming and filling machines and particularly to the paperboard container end closing means on these machines. As hereinafter described this invention is more specifically directed to an apparatus and method for closing a container end so as to be permanently bonded at almost the same instant.

Thermoplastic paperboard containers are being used in increasing quantities in preference to other commonly used means. The success of these new containers has caused a great demand for new forming and filling equipment, and for the conversion of existing equipment for use with these containers. The present disclosure was invented in view of holding down new equipment costs, and in view of limitations imposed by existing equipment that is to be converted. The consideration given to accomplish these goals were mainly governed by (a) the limited number of usable mandrel positions available to perform the required operations, (b) need for keeping all functional stations easily accessible to operators for repair and normal maintenance, and (c) limited allowable time between the heating station and the end closure station. Also the machines to be converted are limited as to the number of bridge support sections available for attaching any added equipment for handling the new container. The older container was disclosed in United States Patent No. 2,750,095 issued June 12, 1956 on the application of Carroll R. Alden (Reissue No. 25,021 issued August 3, 1961). The new container's end closure is disclosed in U.S. Patent No. 3,120,335, issued February 4, 1964. A method of making this end closure is disclosed in U.S. Patent No. 3,166,994, issued January 26, 1965, of which this present invention is an improvement.

One objective of the present invention is to provide a new and improved means of tucking the end closure flaps of a thermoplastic coated paperboard container.

Another objective of the present invention is to provide an apparatus to tuck the flaps of the end closure of a thermoplastic coated paperboard container while it is moving from one station to another.

Another objective of the present invention is to provide for end closure flap tucking between the last heating station and the next station which is the bonding station.

Still another objective is to provide a means to tuck the end closure flaps of a thermoplastic coated paperboard container so that if there is a jam up in the machine there will be release by a detent, insuring that the tucker means will not be damaged.

Another objective is to precisely and accurately tuck the end flaps of a thermoplastic coated paperboard container so as to eliminate jam-ups and the resulting scrap containers.

Also, the objectives of the present invention include the provision of a structure capable of accomplishing the above objectives with a minimum of material cost and fabricating expense, and at the same time being composed of simple and ruggedly constructed elements which are very reliable in operation.

Other objectives and advantages of the invention will be apparent from the following detailed description and claims, taken in connection with the accompanying drawings which form part of the instant specification, and which are to be read in conjunction therewith, and in which like reference numerals are used to indicate like parts in various views.

FIGURE 4 is an elevational front view of the rotating carton tucker assembly showing the detent mechanism in a sectional view;

FIGURE 4a is a plan top view of the rotating carton tucker assembly taken along line 4a—4a in FIG. 4;

FIGURE 4b is an end elevational view of the carton tucker assembly taken along line 4b—4b in FIG. 4;

FIGURE 5 is a perspective view of the tucker shoe;

FIGURE 6 is a partial sectional side view of the power drive system for the rotating carton tucker apparatus;

FIGURE 7 is a plan top view of an alternate rotating carton tucker assembly showing the detent mechanism in a sectional view;

FIGURE 7a is an elevational end view of the alternate rotating carton tucker apparatus showing the relative position of the camming lobe taken along line 7a—7a in FIG. 7;

FIGURE 7b is an elevational end view of the alternate method camming lobe taken along line 7b—7b in FIG. 7;

FIGURE 8 is a perspective side view of the rotating carton tucker apparatus as the mandrel is indexing and the tucker wings are just making contact with the mounted carton;

FIGURE 8a is a perspective side view similar to FIG. 8 with the tucker wings in full contact and the tucker arms and tucker shoe just touching the mounted carton;

FIGURE 8b is a perspective side view similar to FIG. 8a with the tucker wings no longer in contact and the tucker arm and shoe in full contact with the mounted carton;

FIGURE 8c is a perspective side view similar to FIG. 8b with the tuck-over flap just receiving the tuck-in flap;

FIGURE 9 is a perspective side view of an alternate rotating carton tucker apparatus as the mandrel is indexing and the camming lobe is just making contact with the mounted carton;

FIGURE 9a is a perspective side view of the alternate carton tucking apparatus showing the camming lobe at its maximum point of contact, and the tucker arms and shoe just making contact with the mounted carton;

FIGURE 9b is a perspective side view of the alternate carton tucker apparatus at a point where the tucker arms and shoe are in full contact with the mounted carton;

FIGURE 9c is a perspective side view of the alternate apparatus in a position similar to that of FIG. 8c showing the tuck-over flap receiving the tuck-in flap;

FIGURE 10 is a plan view of the power drive system for the rotating carton tucker apparatus;

FIGURE 11 is an end elevational view of the power drive system for the rotating carton tucker apparatus;

FIGURE 12 is an end view in partial section of an alternate power drive means taken along line 12—12 in FIG. 13;

FIGURE 13 is a plan view in partial section of an alternate power drive means taken along line 13—13 in FIG. 12;

FIGURE 14 is a layout view of a blank from which the cartons are erected and showing the inside surface thereof;

Figure 1:
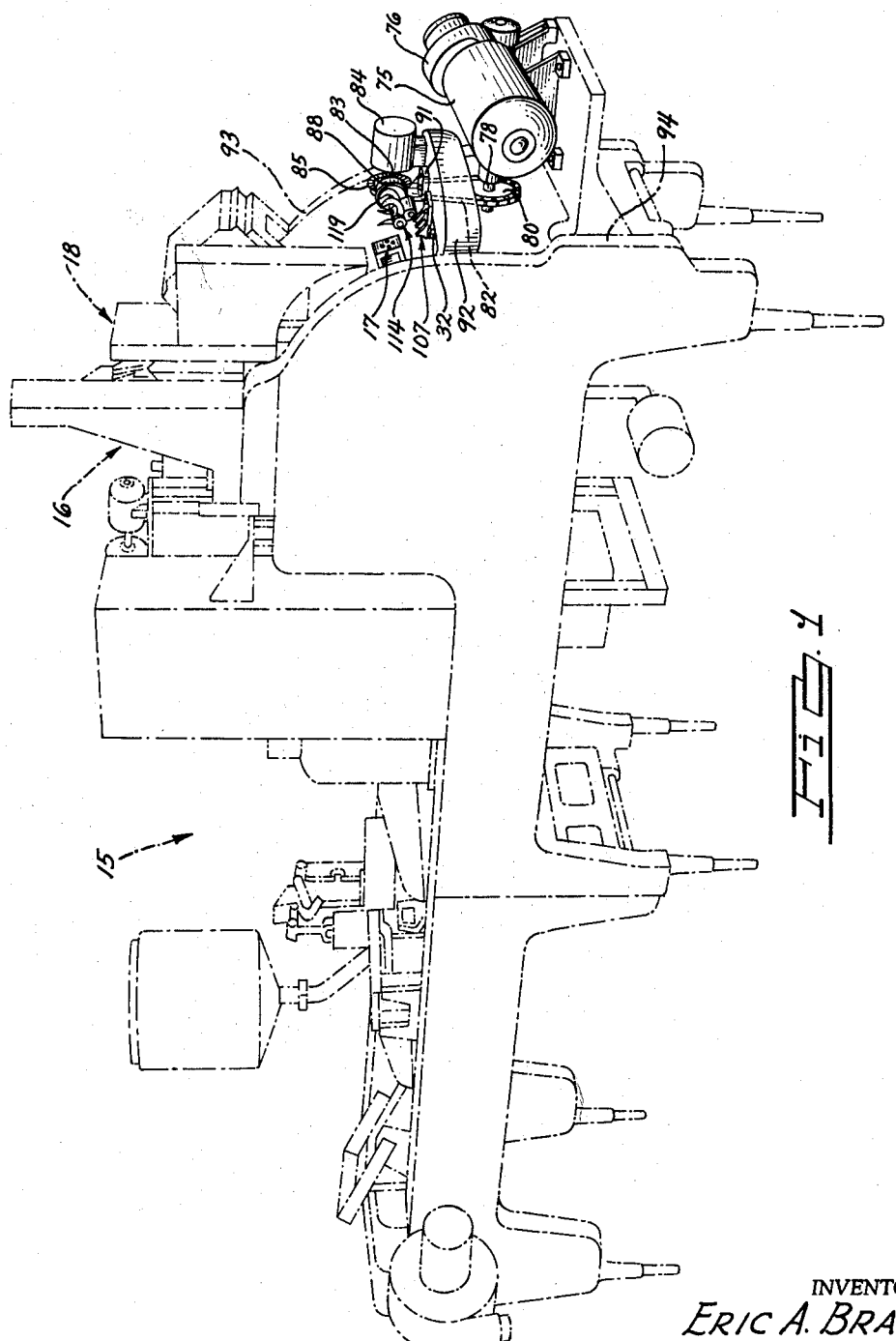
FIGURE 1 is a perspective side view of the rotating carton tucker apparatus as it is used on a forming and filling machine shown here in phantom.

While the invention is susceptible of various modifications and alternative constructions, certain illustrative embodiments have been shown in the drawings and will be described below in considerable detail. It should be understood, however, that there is no intention to limit the invention to the specific forms disclosed but, on the contrary, the intention is to cover all modifications, alternative constructions and equivalents falling within the spirit and scope of the invention as expressed in the appended claims.

GENERAL MACHINE DESCRIPTION

The forming and filling machine generally indicated as 15 in FIG. 1 is similar as to requirements to the forming and filling machines disclosed in United States Patent No. 3,002,328, issued October 3, 1961. The present machine is adapted to receive a supply of flattened side seamed blanks similar to the one shown in FIG. 15. A flattened side seamed blank is removed from a supply and loaded on a rotary mandrel assembly unit. The mandrel assembly is rotated by indexing through various stations at which time an end, in the present case the bottom, is formed and bonded. Before the mandrel assembly is again at the loading position, the container is stripped from the mandrel and passes through a series of operations which prebreaks the top flaps, fills the container and heats and seals the top closure. Then the container is ejected from the end of the machine as a completed carton and is ready for delivery to the consumer.

GENERAL LOADER AND MANDREL DESCRIPTION

Figure 3:
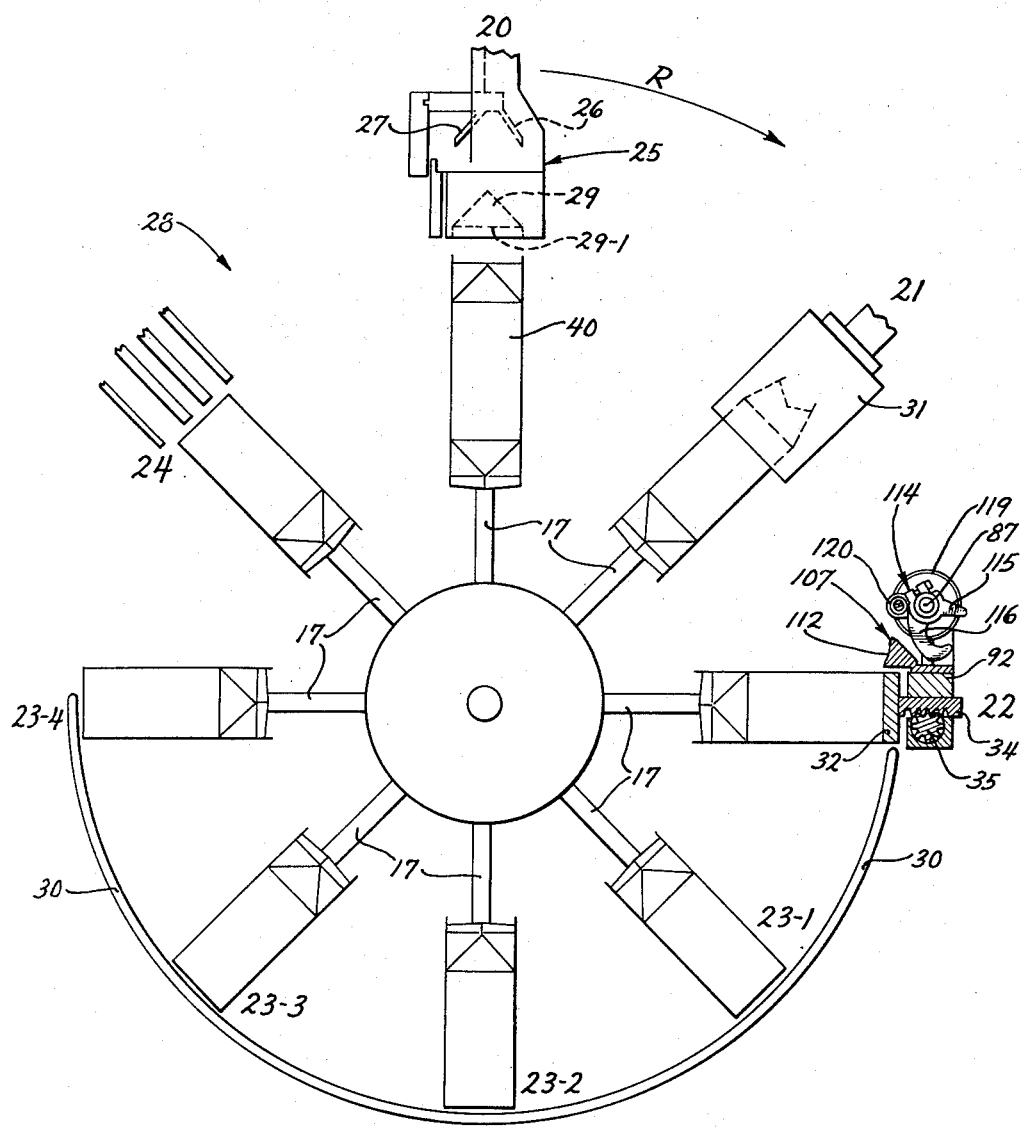
FIGURE 3 is a side elevational view of the mandrel assembly of the forming and filling machine including various associated units for operating on the carton at different stations along its path of movement.

Referring generally to FIGS. 1 and 3, the supply of blanks is indicated as 16, but is not in view as seen in FIG. 1. One blank at a time is removed from the supply 16 and loaded on a mandrel 17 by loader system 18 at load station 20. The mandrel assembly 28 rotates in a clockwise direction R, as shown in FIG. 3. After the container 40 is loaded, the bottom closure panels are prebroken, and then the mandrel assembly 28 is rotated one position to heat station 21. There, the container's end is heated to a sufficient temperature to activate its thermoplastic coating in order to allow bonding, as disclosed in U.S. Patent No. 3,120,335. The assembly is then indexed to forming and bonding station 22. This station is the station which encompasses my present invention and will be explained in detail later in the disclosure. At this station the end closure is tucked, formed, and bonded closed. The container is then rotated through idle stations 23–1, –2, –3, and –4 to stripping station 24. At this station the container is removed from the mandrel, which can be accomplished by a blast of air from the end of the mandrel or by mechanical means catching the top of the container and sliding it off, as examples. Then the mandrel indexes back to the load station 20 to begin the cycle again.

CONTAINER DESCRIPTION

Referring to FIG. 14, the container 40 is in flat blank form pressed with a pattern of appropriate score lines and having its inside surface showing. The container is separated into three sections by score lines 41 and 42. The material above score line 41 is the top closure, a discussion of which is not necessary for disclosure of the present invention; however, a complete disclosure is given in copending application Serial No. 122,571, filed July 7, 1961. The material between scores lines 41 and 42 is the body group and comprises four panels, 43 through 46, and side seam flap 47. The body group is defined on the sides by edges 48 and 49, and with the panels being separated by score lines 51 through 54. The material below score line 42 is the bottom closure group and comprises bottom closure panels 55 and 57, fold-in panels 56 and 58, fold-under panels 63, 64, 67, 68, and flaps 61 and 62, and side seam flap 47. The bottom closure group panels defined on the sides by the edges 48 and 49 are separated by score lines 51 through 54. The bottom closure panel 55 has an extended tuck-in flap 61 and bottom closure panel 57 has an extended tuck-over flap 62. The bottom fold-in panel 56 is flanked by triangular fold-under panels 63 and 64 that are connected thereto by score lines 66 and 65, respectively. Similarly, the bottom fold-in panel 58 is flanked by triangular fold-under panels 67 and 68 that are connected thereto by score lines 72 and 71, respectively.

Figure 15:
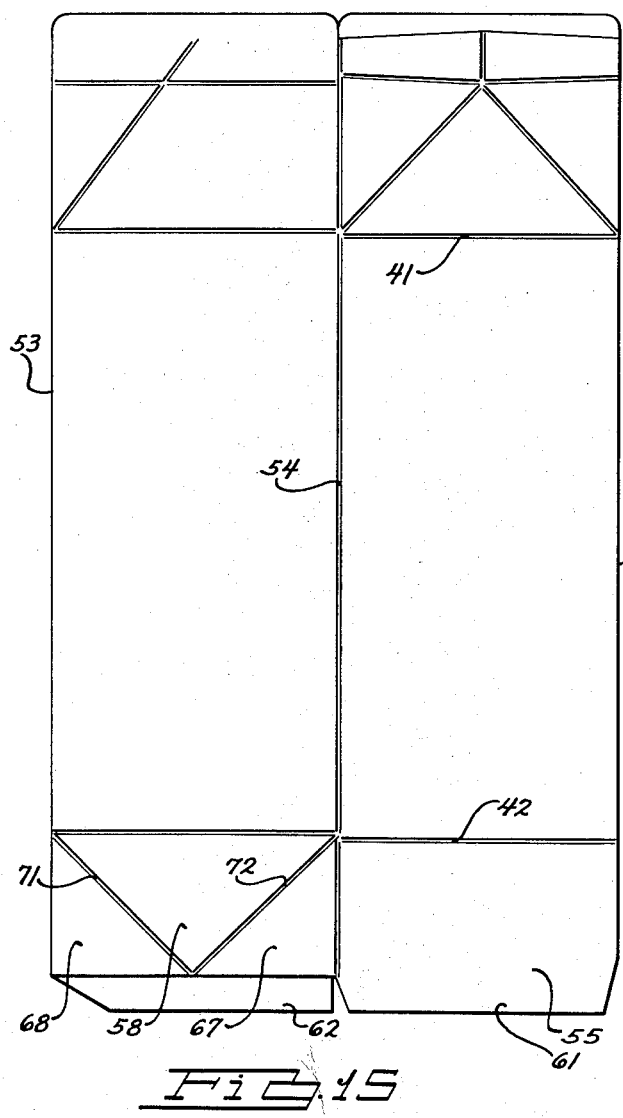
FIGURE 15 is a flat side seamed blank made from the blank shown in FIG. 14 and showing the outside surface thereof.

To form a flat side seamed blank, as is presented to the forming and filling machine 15, the panel 46 and side seam flap 47 are folded about score line 53 until their inside surfaces contact the inside surfaces of panels 45 and 44, respectively. The panel 43 is folded about score line 51 until it contacts the inside surface of panel 44 and the outside surface of side seam flap 47. The surface along edge 48, which will meet the outside edge of the seam flap, will be heated to activate its thermoplastic coating, as will be the outside surface of side seam flap 47, so that the two surfaces will be bonded when pressed together and cooled. The edge 48 and the score line 54 now appear as one line. The flat container blank, as shown in FIG. 14, now looks like flat side seamed container blank 40, as shown in FIG. 15. It is thus ready to be supplied to a forming and filling machine.

Figure 16:
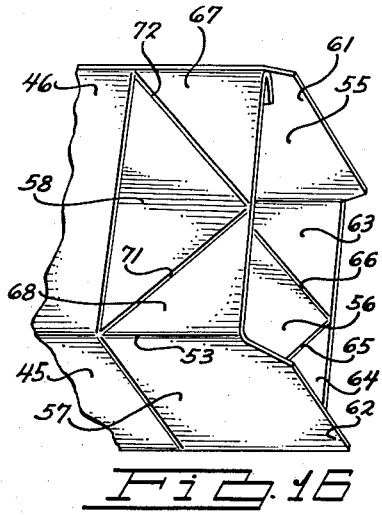
FIGURE 16 is a perspective view of the carton end closure in tubular form as it appears when first mounted on the mandrel assembly.
Figure 17:
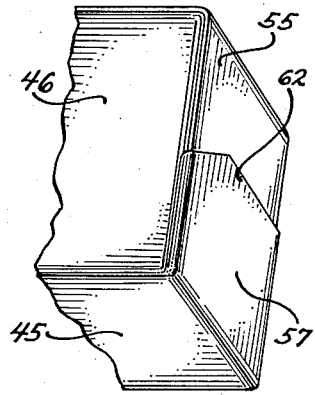
FIGURE 17 is a perspective view of the carton end closure after it has been formed and sealed.

When the container 40 is loaded on the mandrel 17, it takes a tubular shape, as seen in FIG. 16. To form the bottom, panels 55 and 57 are moved toward each other; also the triangular panels 56 and 58 are moved inward toward each other. This causes fold-under panel 68 to rotate around score line 53 so that the inside surfaces of panels 68 and 57 are coming together. At the same time, panel 68 is rotating about score line 71 allowing the outside surfaces of panels 68 and 58 to approach each other. Fold-under panels 63, 64 and 67 make the same movements as panel 68 with panels 55–56, 56–57, and 55–58, respectively. Bottom closure panel 55 moves toward bottom closure panel 57 just enough faster than panel 57 moves toward panel 55 so that tuck-in flap 61 is positioned between fold-under panels 64 and 68, and panels 57 and 62. After the bottom closure is completely formed it appears as shown in FIG. 17.

GENERAL DESCRIPTION OF POWER DRIVE

The power source for the forming and filling machine is an electric motor 75 which has a gear reducer 76 which transmits power along shaft 78. This shaft has barrel cams, gears, etc., to transmit the power and to keep the machine in time.

Referring to FIGS. 1, 2, 6, 10 and 11, a driven gear 80 is secured to and driven by shaft 78. Gear 80 drives driven gear 81 by means of chain 82. Gear 81 is secured to shaft 83, which is supported by housing 84. Bevel gear 85 is also secured to shaft 83 and drives pinion bevel gear 86, which is secured to one end of shaft 87. Shaft 87 is supported by housing 88. At the opposite end of shaft 87 from gear 86, is secured the tucker assembly 114. Housing members 84 and 88 are secured to and held by base 91. Base 91, is, in turn, contacted to bridge member 92 which is supported at its ends by side supports 93 and 94.

An alternate power supply means is shown in FIGS. 12 and 13. In certain applications the electric motor 75 may be mounted in another location, such as inside the front of the machine between side supports 93 and 94. The power is supplied to shaft 78 which is journalled in housing 95. Spur gear 96 is secured to the end of shaft 78 and drives pinion gear 97. Gear 97 is secured to shaft 98 which is also journalled in housing 95. Attached to shaft 98 in housing 105, apart from gear 97, is helical gear 99 which drives helical gear 101. Attached to the end of shaft 98 outside housing 105 is camming lobe 128. Helical gear 101 is secured to shaft 103, which is supported by the housing 105. At the end of shaft 103 is the alternate tucker arm assembly.

GENERAL DESCRIPTION OF THE TUCKER OPERATION

The discussion of this topic will be referring principally to FIGS. 3, 4 through 4b, 5, 7 through 7b, 8 through 8c, and 9 through 9c. The power supply is so connected to the tucker assembly 114 that it rotates continuously and at such a speed that it revolves slightly faster than the container end closure as it indexes from station 21 to 22. The container 40 is loaded on the mandrel 17 at station 20, prebreaker 25 is lowered with cam plates 26 and 27 contacting bottom closure panels 57 and 55, respectively, and camming them toward each other at the same time breaker plates 29 (one on each side of the loaded container) are rotated toward each other about hinges 29–1 contacting bottom fold-in panels 56 and 58. These bottom panels are rotated sufficiently so that score lines 42, 51 through 54, 71, 72, 65 and 66 are prebroken enough to permit proper forming of the bottom at station 22. After the prebreaking operation at station 20, the mandrel assembly 28 is indexed to station 21, where the heater unit 31 activates the thermoplastic coating so that the bottom can be bonded closed at station 22. During the indexing from station 21 to station 22, the bottom is formed by the rotating tucker apparatus 114. After it is positioned at station 22, the pressure pad 32 acts on the bottom closure panels, forcing the thermoplastic coated surfaces together under pressure between the pad and the mandrel end.

Figure 2:
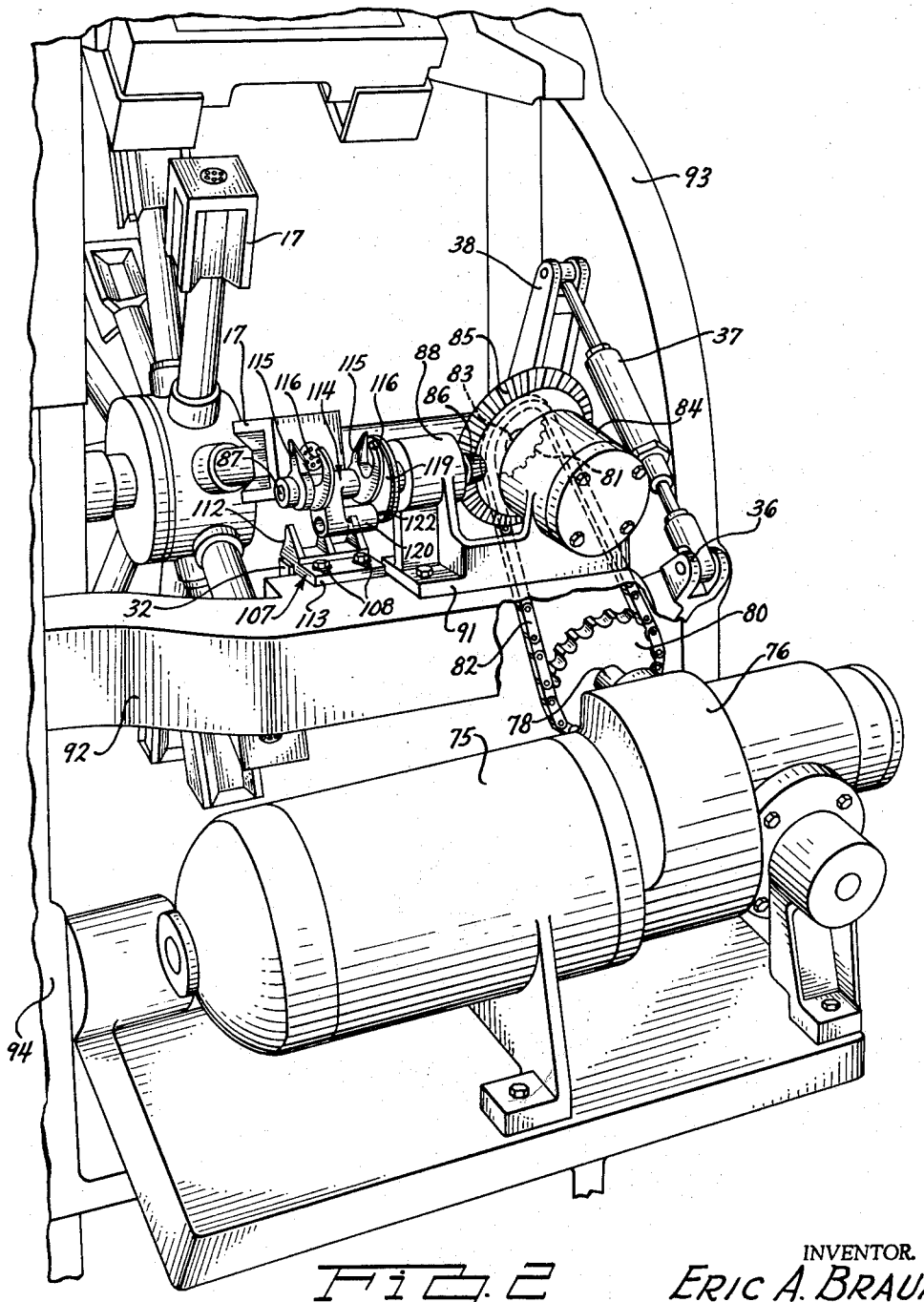
FIGURE 2 is a perspective end view of the forming and filling machine showing the rotating carton tucker apparatus and mandrel assembly in close-up.

The pressure pad 32 is mounted on the end of rack 34 which is actuated by pinion 35 on a shaft that is connected at its opposite end to lever 36, as viewed in FIG. 2. Lever 36, and consequently the pressure pad 32, is linked to lever 38 by adjustable linkage 37, which is, in turn, actuated by a barrel cam (not shown) on the drive shaft 78. Thus, when the mandrel assembly 28 indexes to a stop position, the pressure pad is actuated and the container bottom is bonded.

A tucking shoe 107, shown in FIG. 5, has a body 113, two elliptical bolt holes 108, for adjustable positioning on bridge member 92, undercut 109 to receive pressure pad 32, two camming tips 110, two camming surfaces 112, and recessed camming surface 111 for controlling bottom closure panel 57.

The rotating tucker apparatus 114, as shown in FIGS. 4 through 4b, consists of two tucker arms 116, two tucker wings 115, detent housing 120, detent disc 119, retaining collar 117, and detent disc adjusting collar 118, all mounted on shaft 87. The tucker arms 116 and tucker wings 115 are mounted rotatably on shaft 87 and in fixed relation to each other, while the detent disc 119 is fixed to the shaft by adjusting collar 118.

Looking now at FIGS. 8 through 8c, the tucking action is clearly seen as the carton is indexed to station 22. The first part of the tucker assembly 114 to contact the carton is the tucker wings 115, which begin to press in the fold-in panels 56 and 58. The tucker wings insure that the fold-in panels will move inward, and that there will be no opportunity for them to move outward, resulting in a scrap container. Referring to FIGS. 4b, 5, and 8a, as the mandrel 17 continues to rotate the tucker wings are still pushing in the fold-in panels 56 and 58, as tucker arm camming tips 123 and tucker shoe camming points 110 come in contact with the carton bottom closure panels 55 and 57, respectively. As the mandrel continues to move, the tucker arm camming surfaces 124 contact bottom closure panel 55 and force it toward panel 57 faster than panel 57 is forced by tucker shoe camming surfaces 112 toward panel 55. The recessed tucker shoe camming surface 111 allows a slight bulge to form in bottom closure panel 57, thus forming a pocket between tuck-over flap 62 and panels 64 and 68 to receive the tuck-in flap 61. The next phase of the closing, as seen in FIG. 8c, shows the tuck-in flap 61 entering the pocket formed by flap 62 and panels 64 and 68. As the mandrel continues to index, the tucker arms now lose contact with the carton and the bottom is pushed closed at camming surfaces 112, causing the bottom to be formed as shown in FIG. 17. As the bottom is formed, the mandrel will stop its rotation with aligned with pressure pad 32. The pad 32 is so located that the formed bottom slides over its face preventing the bottom from opening up before the bonding pressure is applied. After the bottom is formed, the mandrel carton indexes through idle stations 23–1, –2, –3 and –4, and is prevented from dropping from the mandrels by guide rail 30. When the mandrel 17 reaches station 24, the carton is ejected.

The alternate power drive, as shown in FIGS. 12 and 13, requires a slight modification in the basic tucker apparatus because of limited usable space. A similar alternate assembly is shown in FIGS. 7 through 7b, and FIGS. 9 through 9c. It is noted, however, that the detent mechanism is not shown in FIGS. 9 through 9c, in order to simplify the drawings and to focus attention on the actual tucking sequence. A camming lobe 128 has been attached to the end of shaft 98 and is set in time with the rest of the alternate tucker assembly 126. This camming lobe pushes fold-in panel 56 inward as seen in FIG. 9a, and accomplishes the same purpose, but in a different manner, as tucker wing 115 in the previous embodiment. One of the tucker arms 116 has been curved so that it can clear the housing 105 as it revolves. It is noted that this curved tucker arm performs the same job in the same manner as the other tucker arm 116. The actual carton tucking action in the alternate method is the same as that described above for the previous embodiment and need not be discussed further.

In certain other applications where variations in container material, coating, processing, etc., might exist, it may be necessary to develop other alternate tucking means. One would be the use of two camming lobes to force in side panels 56 and 58. Another could be the use of only one tucker wing, or only one camming lobe which, by forcing one side panel inward, would also tend to help move the opposite side panel inward enough to guarantee proper bottom closing.

The tucker assembly is adjustable both axially and angularly. The assembly may be adjusted axially by moving retaining collar 117 and detent disc collar 118 along shaft 87 to the desired position. The angular location of the tucker arms and wings, and thus the timing of the tucker apparatus, may also be set by rotating the detent disc and collar about shaft 87 and locking it in the desired position by bolt 125. The camming lobe 128 is also adjustable angularly about shaft 98 and axially along shaft 98.

In some applications, the angular location of the tucker apparatus 114 or 126 may be critical for proper operation. If so, a detent mechanism is incorporated into the tucker apparatus. This consists of an angularly adjustable detent disc 119 having a detent receiving hole 122, and a detent housing 120 shown in section in FIGS. 4 and 7. The detent housing will contain a spring loaded detent 121 that engages with the detent receiving hole 122 to put the tucker arms in timed angular position. If there is any jamming in the machine which prevents the tucker arms from rotating properly, the detent will disengage from the detent disc; thus allowing shaft 87 to rotate freely. When the machine is ready to start operating again, the operator must merely re-engage the detent 121 with the receiving hole 122 in the detent disc 119, and the timing will be re-set automatically. Thus, the mechanism cannot be thrown out of adjustment by jam-ups because the critical timing of the tucker arms can be re-set instantly.

While the embodiments of the present invention as herein disclosed constitute preferred forms, it is to be understood that other forms might be adopted.

I claim the following:

1. A tucking apparatus for a high-speed carton fabricating machine and adapted to operate on the end closure panels of each carton produced in said machine, said apparatus comprising:
   (a) a tucker shoe to operate on a first closure panel,
   (b) a tucker means moving with respect to the tucker shoe in a timed relationship acting on a second closure panel,
   (c) a camming means working in conjunction with the tucker means and tucker shoe bringing said two closure panels together,
   (d) a spring loaded detent housed in the tucker means,
   (e) a detent flange as part of said tucker means having means to receive said detent, and
   (f) said detent and detent flange acting to maintain the timed relationship between the tucker means and the tucker shoe.

2. A tucking apparatus for a carton fabricating machine and adapted to operate on the end closure panels of a tubular carton produced by said machine, said apparatus comprising:
   (a) a tucker shoe to operate on a first closure panel,
   (b) a tucker means moving with respect to the tucker shoe in a timed relationship and acting on a second closure panel,
   (c) a tucker wing acting on a third panel in timed relationship to the said tucker means and tucker shoe, and
   (d) a camming means working in conjunction with the tucker wing, tucker means and tucker shoe bringing said closure panels together.

3. A tucking apparatus as set forth in claim 2, comprising:
   (a) a spring loaded detent housed in said tucker means,
   (b) a detent flange as part of said tucker means having means to receive said detent and
   (c) said detent and detent flange acting to maintain the timed relationship between the tucker wing, tucker means and tucker shoe.

4. A tucking apparatus as set forth in claim 2, comprising:
   (a) a camming lobe to act on a fourth closure panel in a timed relationship with the tucker wing, tucker means, and tucker shoe.

5. A tucking apparatus as set forth in claim 4, comprising:
   (a) a spring loaded detent housed in said tucker means,
   (b) a detent flange as part of said tucker means having means to receive said detent, and
   (c) said detent and detent flange acting to maintain the timed relationship between the tucker wing, tucker means and tucker shoe.

6. A tucking apparatus for a carton fabricating machine and adapted to operate on the end closure panels of a tubular carton produced by said machine, said apparatus comprising:
   (a) a camming means to operate on a first closure panel,
   (b) a rotating tucker means rotating in a timed relationship to the camming means and acting on a second closure panel,
   (c) a camming lobe acting on a third panel in timed relationship to the said tucker means and camming means, and
   (d) a second camming means adjacent said first camming means to bring the said closure panels together.

7. A tucking apparatus as set forth in claim 6, comprising:
   (a) a spring loaded detent housed in said tucker means,
   (b) a detent flange as part of said tucker means and receiving said detent, and
   (c) said detent and detent flange acting to maintain the timed relationship between the camming lobe, rotating tucker means, and first camming means.

8. A tucking apparatus as set forth in claim 6, comprising:
   (a) a second camming lobe to act on a fourth closure panel in a timed relationship with the first camming lobe, rotating tucker means and first camming means.

9. A tucking apparatus for a high-speed carton fabricating machine and adapted to operate on the end closure panels of each carton produced by said machine, said apparatus comprising:
   (a) a rotating tucker means to act on a closure panel,
   (b) a camming means to operate on a second closure panel,
   (c) a pair of tucker wings to act in a timed relationship with the tucker means and camming means on third and fourth closure panels, and
   (d) a second camming means adjacent said first camming means to bring said closure panels together.

10. A tucking apparatus as set forth in claim 9, comprising:
    (a) a spring loaded detent housed in said tucker means,
    (b) a detent flange as part of said tucker means having means to receive said detent, and
    (c) said detent and detent flange acting to maintain the timed relationship between the tucker wings, and rotating tucker means.

11. A tucking apparatus for a high-speed carton fabricating machine and adapted to operate on the end closure panels of each carton produced in said machine, said apparatus comprising:
    (a) a tucker arm to act on a closure panel,
    (b) a camming edge to operate on a second closure panel,
    (c) a camming surface to bring said two closure panels together,
    (d) a tucker arm block which supports said tucker arm,
    (e) a spring loaded detent housed in said tucker arm block,
    (f) a rotating shaft, which supports said tucker arm block, and
    (g) a detent flange secured to said rotating shaft having means to receive said spring loaded detent.

12. A tucking apparatus as set forth in claim 11 comprising:
    (a) said tucker arm block with a means to position said tucker arm axially, angularly, radially, and circumferentially.

References Cited by the Examiner
UNITED STATES PATENTS
1,844,661  2/32  Kimball et al. _____ 53—374

FRANK E. BAILEY, *Primary Examiner.*